(No Model.)
J. W. LANE.
MILK CAN COVER.
No. 277,140. Patented May 8, 1883.
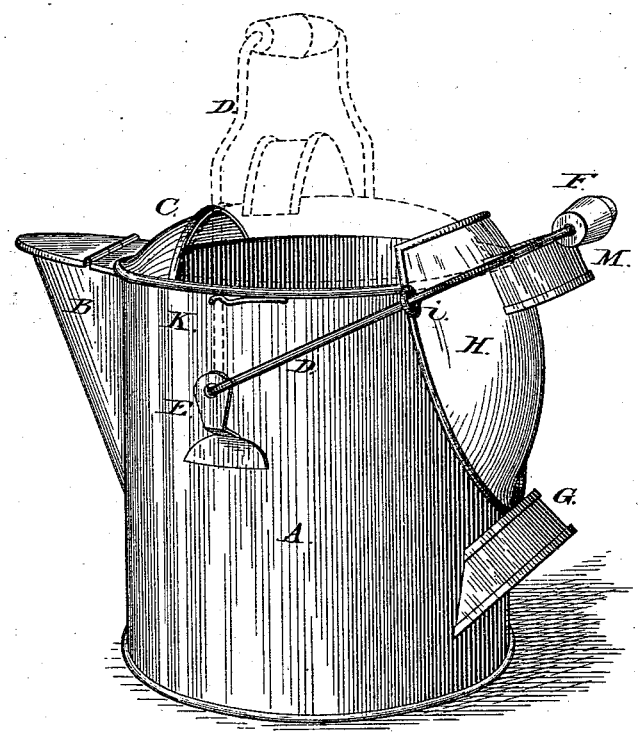
Witnesses:
John A. Ellis
A. W. Steiger
Inventor:
James W. Lane
By David A. Burr
Attorney.

UNITED STATES PATENT OFFICE.

JAMES W. LANE, OF GLEN COVE, NEW YORK.

MILK-CAN COVER.

SPECIFICATION forming part of Letters Patent No. 277,140, dated May 8, 1883.

Application filed March 19, 1883. (No model.)

*To all whom it may concern:*

Be it known that I, JAMES W. LANE, of Glen Cove, in the county of Queens, State of New York, have invented a new and useful Improvement in Milk-Can Covers; and I do hereby declare that the following is a full and exact description thereof, reference being had to the accompanying drawing, and to the letters of reference marked thereon, making a part of this specification.

My invention relates to a covered pail more especially designed for the use of milkmen.

It consists in the combination, with the bail of the pail, of a cover fitted between the arms of the bail and attached thereto by rings or eyes on either side, which are fitted to slide upon said arms, so that the cover may move freely thereon and yet be carried thereby to and from the top of the pail as the bail is carried from a vertical toward a horizontal position, and vice versa.

In the delivery of milk, and in the use of covered pails generally, much loss of time occurs and oftentimes great annoyance in handling a loose, detached cover. A hinged cover is objectionable, in that it is in the way when thrown open and soon breaks off or becomes deranged in use.

The object of my invention is to provide a cover which is readily thrown open, is entirely out of the way when opened, and which, nevertheless, remains attached to the can, so as to admit of being quickly and conveniently replaced by a simple movement of the bail, and when so placed is automatically locked and secured.

The accompanying drawing illustrates in perspective a pail fitted with my improvement, the swinging cover being shown in positive lines as thrown off from the pail, and by dotted lines as in position to close it.

A is the pail; B, its spout; C, a funnel-piece secured upon the top edge of the pail immediately over the spout; D, the bail of the pail, hinged thereto by means of the lateral ears E, and provided with a handle, F, in the customary manner; and G, a tipping-handle secured, as usual, to the outside of the pail near the bottom thereof, diametrically opposite the spout. H is a detachable covering-piece, so formed as to fit closely upon the top of the pail and against the fixed covering-piece C in front. This removable lid or cover is connected with the bail D by means of eyes $i$. These eyes each embrace the bail loosely, and are secured upon the edge of the cover to project therefrom in line with the bail when the cover is in position upon the top of the pail, and the bail is in its elevated position, as shown in dotted lines in the drawing. When in this elevated position the bail is secured and confined by means of spring-catches K, secured to the pail on either side just below its rim. By thus engaging and locking the bail these catches serve to hold and confine the cover in place upon the pail; but by throwing back the bail the cover is carried with it, as shown in positive lines in the drawing, and its shape permits it to drop back entirely out of the way against the side of the pail. To facilitate its removal and replacement it may be provided with a handle, M. The spring-catches K are so fastened as to yield to a forcible pull upon the bail in the proper direction for its release therefrom; but otherwise their hold thereon is sufficiently firm to secure the cover against removal under any ordinary conditions. These catches will automatically engage the bail and so lock the cover whenever it is replaced upon the pail.

I claim as my invention—

1. The combination, with a pail and its swinging bail, of a removable cover attached to the bail by lateral eyes secured to the cover and sliding freely upon the bail, substantially in the manner and for the purpose herein set forth.

2. The combination, with the pail A, its swinging bail D, and a fixed funnel-piece, C, upon its upper front edge, of a removable lid or cover, H, adapted to rest against the funnel-piece C and close the pail, fitted with lateral eyes $i$, embracing the bail, so that the cover shall be carried thereby and be free to move thereon, substantially in the manner and for the purpose herein set forth.

3. The combination, with the pail A, its bail D, and a removable cover carried by the bail, of spring-catches K, adapted to engage the bail when in its vertical position, and thereby confine the cover upon the pail, substantially in the manner and for the purpose herein set forth.

In testimony whereof I have signed my name to this specification in the presence of two subscribing witnesses.

JAMES W. LANE.

Witnesses:
A. W. STEIGER,
JOHN A. ELLIS.